(12) United States Patent
Melius

(10) Patent No.: US 7,942,631 B2
(45) Date of Patent: May 17, 2011

(54) METHOD AND APPARATUS FOR POWERING A PITCH CONTROL SYSTEM

(75) Inventor: Jeffrey Alan Melius, Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/605,633

(22) Filed: Oct. 26, 2009

(65) Prior Publication Data

US 2010/0135791 A1     Jun. 3, 2010

(51) Int. Cl.
    *F03D 7/02* (2006.01)
(52) U.S. Cl. .............................. 415/155; 415/1
(58) Field of Classification Search .............. 416/1, 155; 318/493; 388/803; 290/44, 55
    See application file for complete search history.

(56) References Cited

U.S. PATENT DOCUMENTS

| | | | | |
|---|---|---|---|---|
| 4,037,144 A | * | 7/1977 | Ohmae et al. | 388/806 |
| 4,549,122 A | * | 10/1985 | Berkopec et al. | 388/806 |
| 4,845,413 A | * | 7/1989 | Hackl et al. | 388/805 |
| 5,332,954 A | | 7/1994 | Lankin | |
| 5,907,192 A | | 5/1999 | Lyons et al. | |
| 7,042,110 B2 | | 5/2006 | Mikhail et al. | |
| 7,126,236 B2 | | 10/2006 | Harbourt et al. | |
| 7,245,037 B2 | | 7/2007 | Anqquist et al. | |
| 7,488,155 B2 | | 2/2009 | Barbu et al. | |
| 7,740,448 B2 | * | 6/2010 | Meyer et al. | 416/1 |
| 2009/0058086 A1 | | 3/2009 | Arinaga et al. | |

* cited by examiner

*Primary Examiner* — Ninh H Nguyen
(74) *Attorney, Agent, or Firm* — James McGinness, Esq.; Armstrong Teasdale LLP

(57) ABSTRACT

A pitch control system for a wind turbine having a motor including an armature, a winding, and a plurality of switching components configured to control a first current through the armature independently of a second current through the winding.

17 Claims, 3 Drawing Sheets

METHOD AND APPARATUS FOR POWERING A PITCH CONTROL SYSTEM

BACKGROUND OF THE INVENTION

The subject matter described herein relates generally to wind turbines and, more particularly, to a method and apparatus for powering a pitch control system of a wind turbine.

In at least one known wind turbine, a control system pitches one or more blades to adjust an operation of the wind turbine. The pitch control system includes a motor that rotatably drives the blades to a desired pitch angle to adjust an amount of wind energy captured by the blades. Known pitch control systems typically use a direct current (DC) motor that has a series field winding to pitch the blades. Such DC motors may include a dynamic braking resistor to facilitate absorbing excess energy generated by the DC motor during motor braking conditions. Moreover, to reverse a rotational direction of the DC motor, a plurality of rectification diodes are included in the pitch control system. Such dynamic braking resistors and rectification diodes may add cost and complexity to known pitch control systems, and may produce energy losses within the pitch control systems.

Moreover, in at least one known wind turbine, the series field winding of the DC motor shares a current with an armature of the DC motor. The current may be increased or decreased to adjust an operation of the DC motor. However, due to the common current between the armature and the winding, an adjustment of the armature current will also affect the winding current. As such, independent control of the armature and the winding of the DC motor may not be possible.

BRIEF DESCRIPTION OF THE INVENTION

In one embodiment, a pitch control system for a wind turbine is provided. The pitch control system includes a motor including an armature and a winding. The pitch control system also includes a plurality of switching components configured to control a first current through the armature independently of a second current through the winding.

In another embodiment, a wind turbine is provided that includes at least one blade and at least one pitch control system coupled to the at least one blade. The at least one pitch control system includes a motor including an armature and a winding. The at least one pitch control system also includes a plurality of switching components configured to control a first current through the armature independently of a second current through the winding.

In yet another embodiment, a method of powering a pitch control system including an armature and a winding is provided. A first power source and a second power source are coupled to the pitch control system and a plurality of switching components is coupled to the motor. The plurality of switching components is configured to control a first current through the armature independently of a second current through the winding.

DETAILED DESCRIPTION OF THE INVENTION

The embodiments described herein provide a pitch control system for a wind turbine. The pitch control system includes a motor that includes an armature and a winding. The motor is configured to receive a first current through the armature and a second current through the winding. A plurality of switching components within the pitch control system controls the first current independently of the second current while the pitch control system receives power from an electric utility grid. During such operation, the winding may absorb at least a portion of excess energy within the pitch control system, such as energy produced when the motor decelerates. If the pitch control system receives power from a backup power supply, such as a battery, the pitch control system controls the armature and the winding via a common current. As such, the pitch control system operates the motor as a series DC motor while the pitch control system receives backup power. Moreover, the pitch control system facilitates operating the motor without a dynamic braking resistor and/or field rectification diodes.

The embodiments described herein measure an angle of inclination of a wind turbine tower with respect to a surface. A control system calculates one or more wind properties based on the measured angle of inclination and compares the wind properties to one or more desired operating properties of the wind turbine. The control system adjusts a pitch angle of one or more rotor blades of the wind turbine based on the comparison. The adjustment of the pitch angle increases or reduces an amount of force that is transferred to the wind turbine from the wind, thus adjusting a displacement of a nacelle and/or a hub of the wind turbine.

Figure 1:
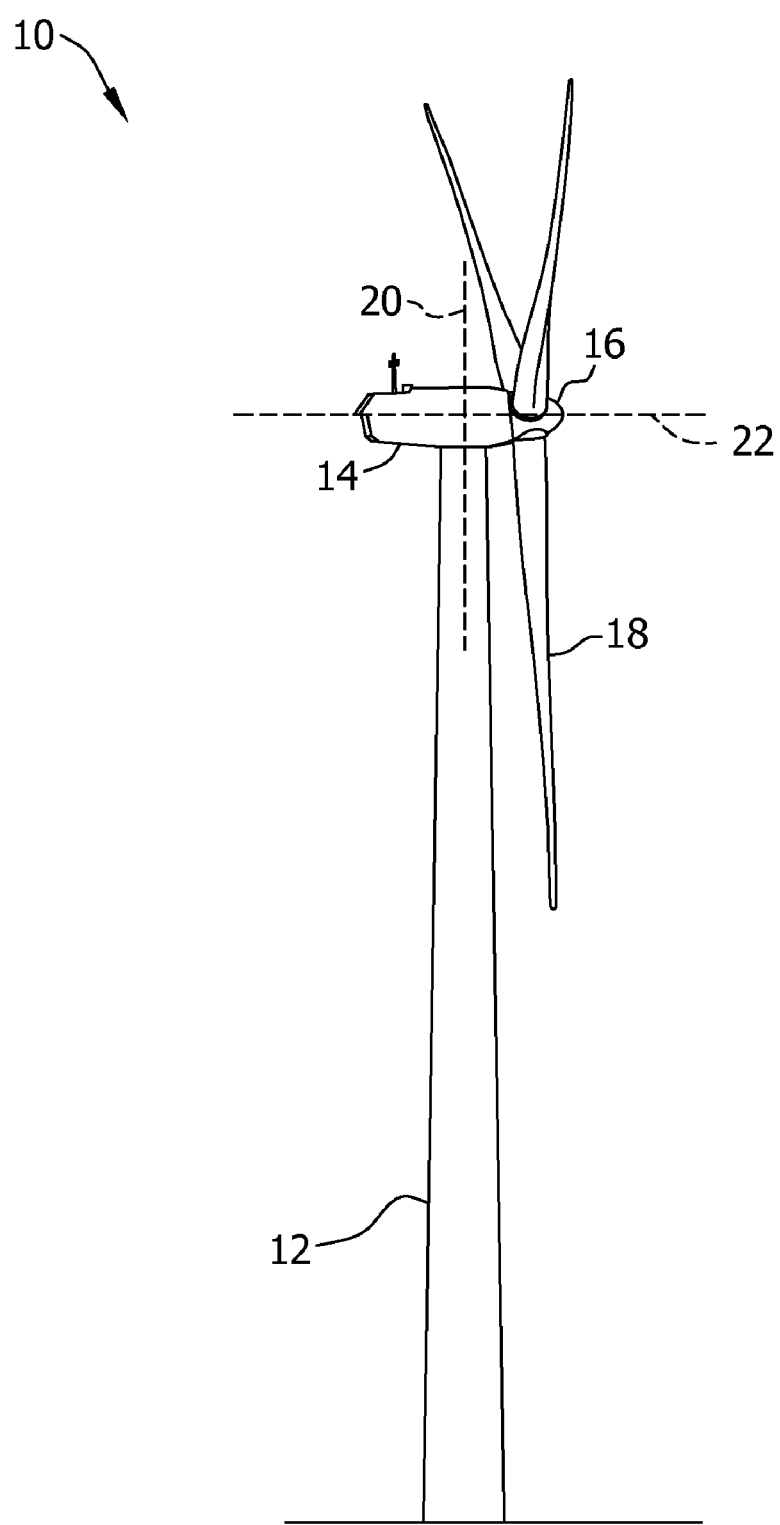
FIG. 1 is a perspective side view of an exemplary wind turbine.

FIG. 1 shows an exemplary wind turbine 10. In the exemplary embodiment, wind turbine 10 includes a tower 12, a nacelle 14 that is coupled to tower 12, a hub 16 that is coupled to nacelle 14, and at least one blade 18 that is coupled to hub 16. Tower 12 provides support for nacelle 14, hub 16, and blade 18. Nacelle 14 is coupled to tower 12. Nacelle 14 houses components (not shown) for use in transforming rotational energy of blade 18 into electricity. Hub 16 is coupled to nacelle 14. Hub 16 provides a rotatable housing for at least one blade 18. At least one blade 18 is coupled to hub 16. In the exemplary embodiment, three blades 18 are coupled to hub 16. Blades 18 are rotatable about an axis of rotation 22 when wind strikes blades 18. In the exemplary embodiment, each blade 18 is oriented substantially perpendicularly to the ground. Each blade 18 rotates through substantially the same plane of rotation and substantially parallel to a centerline axis 20 of tower 12.

Figure 2:
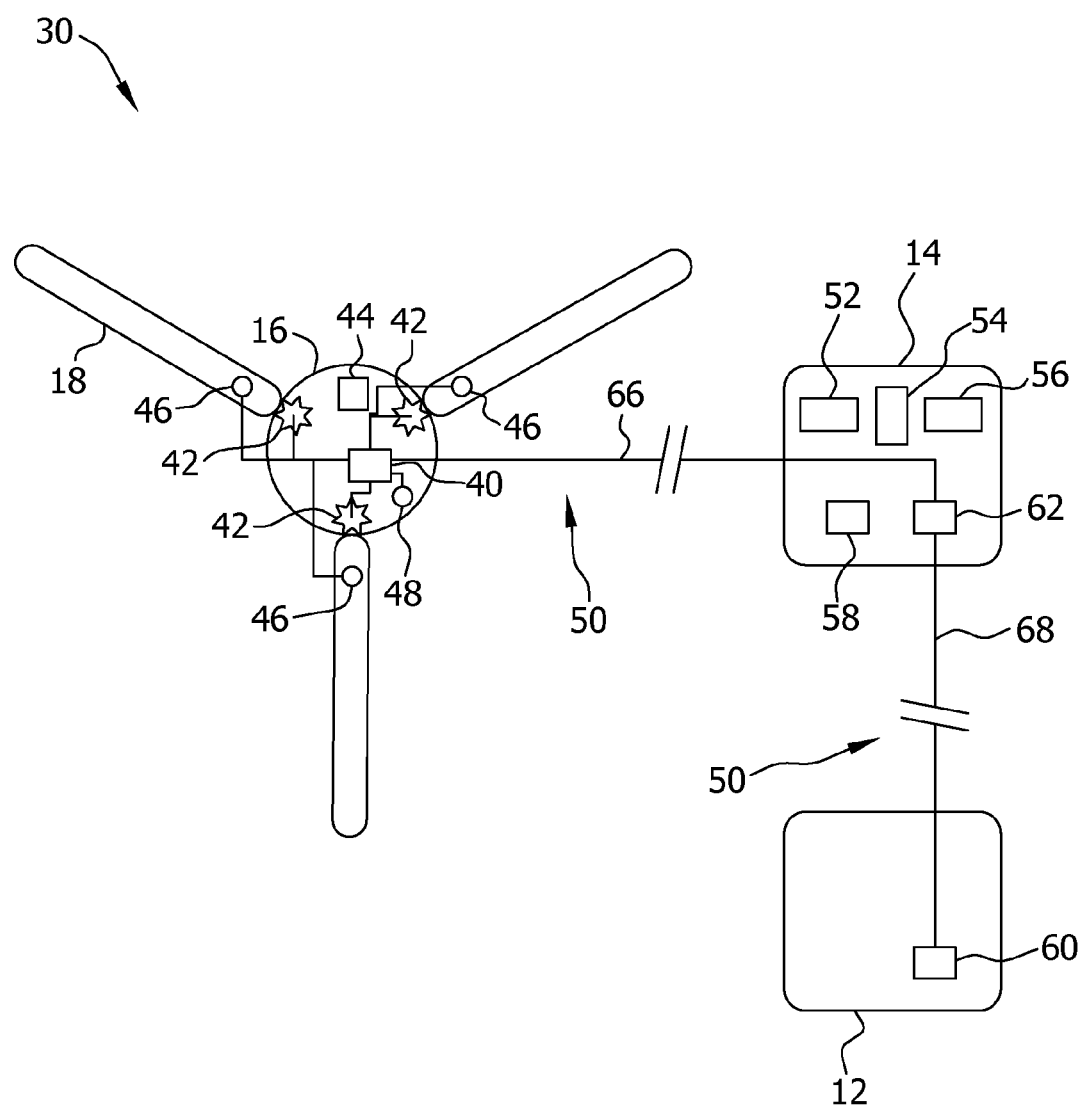
FIG. 2 is a block diagram of an exemplary wind turbine control system that may be used with the wind turbine shown in FIG. 1.

FIG. 2 schematically shows a block diagram of an exemplary wind turbine control system 30 that may be used with wind turbine 10 (shown in FIG. 1). Control system 30 is coupled to components within hub 16, blades 18, nacelle 14, and tower 12. In the exemplary embodiment, a pitch controller 40, at least one pitch drive 42, a hub backup power supply 44, and a hub sensor 48 are positioned on or within hub 16. Pitch controller 40 is coupled to blades 18 through pitch drives 42. In one embodiment, hub 16 includes three pitch drives 42, and pitch controller 40 is coupled to each blade 18 via a respective pitch drive 42.

In the exemplary embodiment, pitch controller 40 is located within hub 16 and controls, for example, a pitch angle (not shown) and/or a relative position (not shown) of blades 18. Moreover, pitch controller 40 utilizes a communication network 50 to communicate with a wind turbine controller 60. In the exemplary embodiment, pitch controller 40 includes a programmable logic controller (PLC). In an alternative embodiment, pitch controller 40 includes a microprocessor, a microcontroller, a field programmable gate array (FPGA) or any other programmable circuit that enables pitch controller 40 to operate as described herein. As used herein, the term "control" includes, but is not limited to only including, issuing commands to be implemented by exercising oversight and supervision of, and/or directing operation of, one or more subject components. The term "control" also includes a regulation-type of control, e.g., a feedback-loop regulation.

In the exemplary embodiment, pitch drives 42 receive one or more pitch commands from pitch controller 40, and in response, rotate blades 18 to a desired position and/or pitch angle identified by the pitch commands. Pitch drives 42 may rotate blades 18 using, for example, hydraulic, electric, and/or gear-driven means. In the exemplary embodiment, hub sensor 48 determines a speed of rotation of and/or a load induced to hub 16. Hub backup power supply 44 may include, for example, a battery, a magnetic energy storage device, and/or one or more capacitors. Hub backup power supply 44 provides electrical power to components within hub 16, such as pitch controller 40, pitch drives 42, and hub sensor 48.

In the exemplary embodiment, a blade sensor 46 is coupled to each blade 18, as shown in FIG. 2. Each blade sensor 46 is also coupled to pitch controller 40. Blade sensors 46 enable a rotational speed of each blade 18 and/or a load induced to each blade 18 to be determined.

In the exemplary embodiment, nacelle 14 includes a gearbox 52, a brake 54, a generator 56, a battery 58, and a nacelle controller 62. In an alternative embodiment, nacelle 14 does not include gearbox 52. In another alternative embodiment, nacelle 14 does not include nacelle controller 62. In the exemplary embodiment, gearbox 52 augments the rotation of a main rotor shaft (not shown) driven by the rotation of blades 18, thereby inducing a higher amount of rotational energy to generator 56. Brake 54 may provide emergency stopping power to generator 56 and/or to wind turbine 10 operation in an event of a fault or other error condition. Generator 56 transforms the rotational energy of the main rotor shaft into electrical energy. Generator 56 may be of any suitable type that enables wind turbine 10 to function as described herein. For example, and without limitation, in one embodiment, generator 56 is a wound rotor induction generator, such as a doubly fed induction generator. Battery 58 provides backup electrical power to components within nacelle 14 and/or tower 12.

Nacelle controller 62 controls the operation of components within nacelle 14, such as gearbox 52, brake 54, generator 56, and/or battery 58. In the exemplary embodiment, nacelle controller 62 is coupled to pitch controller 40 and to wind turbine controller 60 via communication network 50. More specifically, in the exemplary embodiment, nacelle controller 62 is coupled to pitch controller 40 via a nacelle-hub network 66, and to wind turbine controller 60 via a nacelle-tower network 68.

In the exemplary embodiment, wind turbine controller 60 is located within tower 12. In an alternative embodiment, wind turbine controller 60 is located within nacelle 14. Moreover, in the exemplary embodiment, wind turbine controller 60 operates as a master controller of wind turbine 10 and of control system 30, and may include a computer or other processor that is programmed to execute control algorithms. As used herein, the term "processor" includes, without limitation, any programmable system including systems and microcontrollers, reduced instruction set circuits (RISC), application specific integrated circuits (ASIC), programmable logic circuits (PLC), and any other circuit capable of executing the functions described herein. Wind turbine controller 60 may control other controllers of wind turbine 10, such as pitch controller 40, communicate with other wind turbines (not shown) and/or a wind farm management system (not shown), and/or perform error handling and operational optimization. Moreover, wind turbine controller 60 may also execute a SCADA (Supervisory, Control and Data Acquisition) program.

Hub 16 is communicatively coupled to nacelle 14 and to tower 12 via communication network 50. Communication network 50 includes nacelle-hub network 66 and nacelle-tower network 68. More specifically, in the exemplary embodiment, hub 16 is coupled to nacelle 14 via nacelle-hub network 66, and nacelle 14 is coupled to tower 12 via nacelle-tower network 68. Moreover, pitch controller 40 is coupled to wind turbine controller 60 via nacelle-hub network 66 and via nacelle-tower network 68. In the exemplary embodiment, nacelle-hub network 66 uses a slip ring connection to transmit signals via a serial communication protocol or another suitable communication protocol, such as broadband over power line (BPL) protocol. In an alternative embodiment, nacelle-hub network 66 includes any other connection that enables network 66 to operate as described herein. In the exemplary embodiment, nacelle-tower network 68 includes one or more of such connections as Ethernet Local Area Network (LAN), wireless LAN, a Controller Area Network (CAN) bus, fiber optic connection, or any other communication connection (all not shown) that enables nacelle-tower network 68 to operate as described herein.

Figure 3:
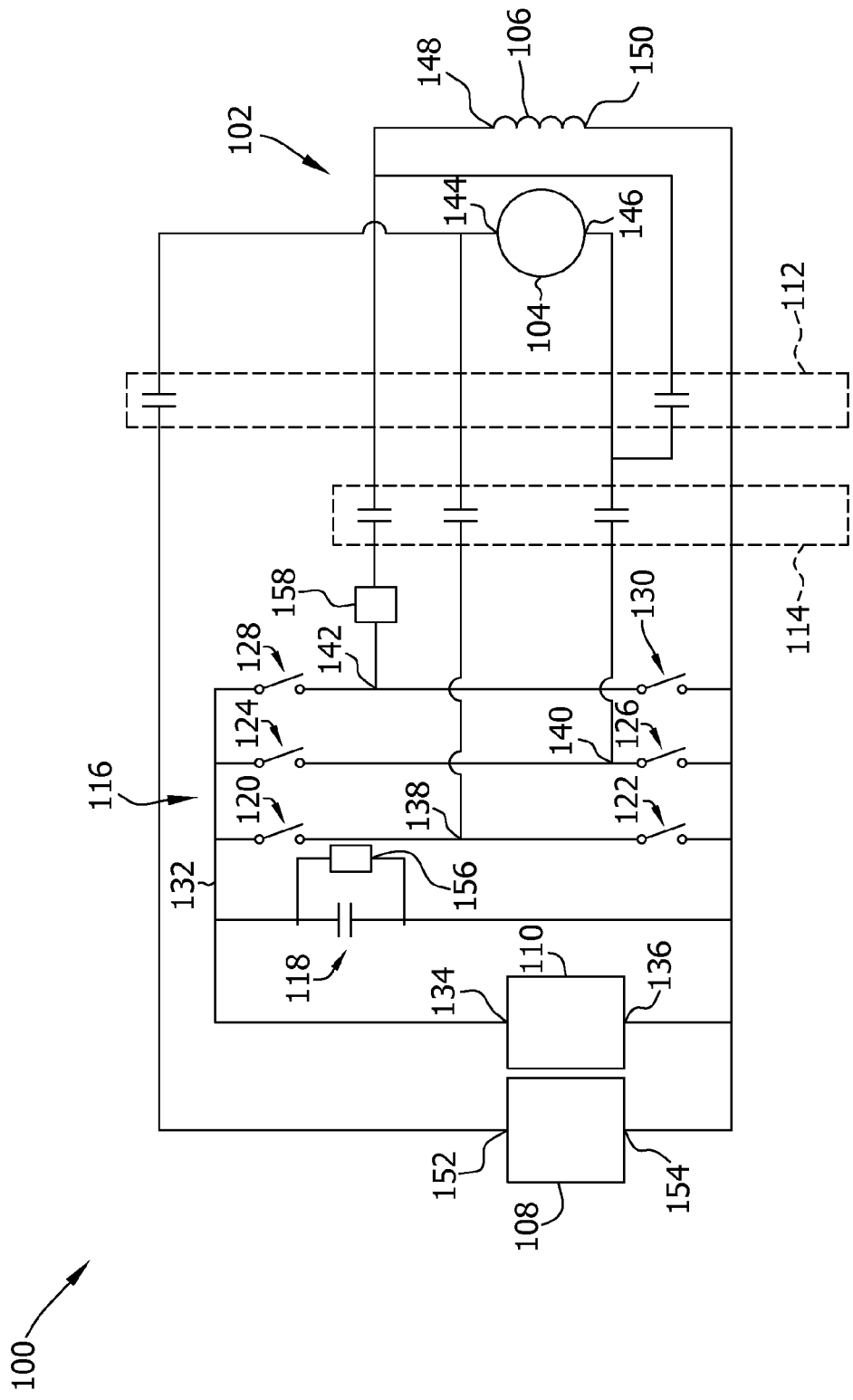
FIG. 3 is a schematic diagram of an exemplary pitch control system that may be used with the wind turbine shown in FIG. 1.

FIG. 3 schematically shows a pitch control system 100 that may be used with, or in place of, pitch drive 42 (shown in FIG. 2) to pitch one or more blades 18 of wind turbine 10 (both shown in FIG. 1). In the exemplary embodiment, pitch control system 100 includes a motor 102 that includes an armature 104 and a winding 106.

In the exemplary embodiment, pitch control system 100 receives power from battery source 108 and grid source 110. Battery source 108 includes one or more batteries, capacitors, and/or any suitable energy storage device that enables pitch control system 100 to operate as described herein. In the exemplary embodiment, grid source 110 is coupled to a rectified output of an alternating current (AC) power grid. In an alternative embodiment, grid source 110 is coupled to any suitable direct current (DC) or rectified AC power source that enables pitch control system 100 to operate as described herein. In the exemplary embodiment, battery source 108 and grid source 110 provide substantially DC power to pitch control system 100 and, specifically, to motor 102. Battery source 108 is switchably coupled to motor 102 via one or more battery contactors 112, and grid source 110 is switchably coupled to motor 102 via one or more grid contactors 114. Battery contactors 112 may be opened or closed to electrically decouple or couple, respectively, battery source 108 and motor 102. Grid contactors 114 may be opened or closed to electrically decouple or couple, respectively, grid source 110 and motor 102 as desired. In the exemplary embodiment, only one of battery source 108 and grid source 110 is connected to, and powers, motor 102 at a given time. Battery contactors 112 and/or grid contactors 114 may include one or more contactors, relays, or other suitable components that enable pitch control system 100 to operate as described herein.

In the exemplary embodiment, pitch control system 100 includes a plurality of switching components 116 and at least one capacitor 118. Capacitor 118 facilitates smoothing a voltage from grid source 110, and facilitates providing a high frequency current to switching components 116. Switching components 116 facilitate controlling an operation of motor 102, such as by controlling a current to armature 104 and/or winding 106. In the exemplary embodiment, switching components 116 are coupled to motor 102 when grid source 110 powers pitch control system 100, i.e., when grid contactors 114 are closed and battery contactors 112 are open. Alternatively, when grid contactors 114 are open, and battery contactors 112 are closed, switching components 116 are substantially electrically isolated from motor 102, and motor 102 is substantially controlled and powered by battery source 108.

In the exemplary embodiment, switching components 116 include a first switch 120, a second switch 122, a third switch 124, a fourth switch 126, a fifth switch 128, and a sixth switch 130. First switch 120, third switch 124, and fifth switch 128 are coupled to a first terminal 134 of grid source 110 via a DC link 132. Second switch 122, fourth switch 126, and sixth switch 130 are coupled to a second terminal 136 of grid source 110. In the exemplary embodiment, switching components 116 include metal-oxide semiconductor field-effect transistors (MOSFETs). In an alternative embodiment, switching components 116 include insulated gate bipolar transistors (IGBTs), bipolar junction transistors (BJTs), or any suitable switching device that enables pitch control system 100 to operate as described herein.

First switch 120 and second switch 122 are coupled to each other at a common node 138, and are coupled in parallel with grid source 110. Common node 138 of first switch 120 and second switch 122 is coupled to a first terminal 144 of armature 104. Third switch 124 and fourth switch 126 are coupled to each other at a common node 140, and are coupled in parallel with grid source 110. Common node 140 of third switch 124 and fourth switch 126 is coupled to a second terminal 146 of armature 104. Fifth switch 128 and sixth switch 130 are coupled to each other at a common node 142, and are coupled in parallel with grid source 110. Common node 142 of fifth switch 128 and sixth switch 130 is coupled to a first terminal 148 of winding 106. A first terminal 152 of battery source 108 is coupled to first terminal 144 of armature 104. A second terminal 150 of winding 106 is coupled to second switch 122, fourth switch 126, and sixth switch 130, to second terminal 136 of grid source 110, and to a second terminal 154 of battery source 108.

Capacitor 118 is coupled in parallel with grid source 110, and more specifically, is coupled to first terminal 134 of grid source 110 via DC link 132 and to second terminal 136 of grid source 110. In the exemplary embodiment, a voltage sensor 156 measures a voltage across capacitor 118, and a current sensor 158 measures a current transmitted between first terminal 148 of winding 106 and common node 142 of fifth switch 128 and sixth switch 130.

In the exemplary embodiment, pitch controller 40 (shown in FIG. 2) is operatively coupled to pitch control system 100. When pitch control system 100 is powered by grid source 110, pitch controller 40 facilitates controlling an operation of pitch control system 100, and, more specifically, an operation of motor 102, as more fully described herein. In the exemplary embodiment, pitch controller 40 receives voltage measurements from voltage sensor 156 and current measurements from current sensor 158. Pitch controller 40 may adjust one or more switching characteristics, such a duty cycle, of switching components 116 based on the received voltage and/or current measurements.

During operation, in the exemplary embodiment, grid contactors 114 are closed and battery contactors 112 are open such that grid source 110 provides power to pitch control system 100. More specifically, in the exemplary embodiment, first switch 120, second switch 122, third switch 124, and fourth switch 126 transmit DC current from grid source 110 to armature 104. Fifth switch 128 and sixth switch 130 transmit DC current from grid source 110 to winding 106. As such, armature 104 and winding 106 are separately controlled and powered while grid source 110 powers pitch control system 100.

In the exemplary embodiment, pitch controller 40 controls a duty cycle of each switching component 116. More specifically, pitch controller 40 adjusts the duty cycle of each switching component 116 to control an amount of current carried through each switching component 116 to motor 102. To provide more current to armature 104, pitch controller 40 increases the duty cycle of first switch 120 or third switch 124. Moreover, pitch controller 40 operates first switch 120 and second switch 122 at alternating duty cycles, third switch 124 and fourth switch 126 at alternating duty cycles, and fifth switch 128 and sixth switch 130 at alternating duty cycles. As used herein, "alternating" or "alternates" refers to opening and closing a switch at an opposite time as another switch, such that when one switch is open, the other switch is closed, and vice versa. As such, alternating switches have duty cycles that are substantially inverses of each other.

When motor 102 is to be driven in a clockwise direction, pitch controller 40 opens third switch 124 and closes fourth switch 126. Pitch controller 40 operates first switch 120 and second switch 122 at alternating duty cycles. Pitch controller 40 increases the duty cycle of first switch 120 to increase a rotational speed of motor 102, and decreases the duty cycle of first switch 120 to decrease the rotational speed of motor 102. As such, to achieve a maximum rotational speed of motor 102 in the clockwise direction, pitch controller 40 operates first switch 120 at approximately a 100% duty cycle, and to achieve a substantially stationary state of motor 102, pitch controller 40 operates first switch 120 at approximately a 0% duty cycle.

When motor 102 is to be reversed, i.e., driven in a counterclockwise direction, pitch controller 40 opens first switch 120 and closes second switch 122. Pitch controller 40 operates third switch 124 and fourth switch 126 at alternating duty cycles. Pitch controller 40 increases the duty cycle of third switch 124 to increase a rotational speed of motor 102, and decreases the duty cycle of third switch 124 to decrease the rotational speed of motor 102. As such, to achieve a maximum rotational speed of motor 102 in the counterclockwise direction, pitch controller 40 operates third switch 124 at approximately a 100% duty cycle, and to achieve a substantially stationary state of motor 102, pitch controller 40 operates third switch 124 at approximately a 0% duty cycle.

Pitch controller 40 also operates fifth switch 128 and sixth switch 130 to control a current through winding 106. As such, grid source 110 and switching components 116 facilitate providing separately controlled currents to armature 104 and winding 106 such that motor 102 operates as a separately excited DC motor. Motor 102 may generate excess, or regenerative, energy within pitch control system 100, such as during a motor braking operation. If excess energy is present in pitch control system 100, pitch controller 40 may direct the excess energy to winding 106 such that winding 106 absorbs at least a portion of the excess energy. More specifically, if the voltage measured by voltage sensor 156 rises above a threshold determined by pitch controller 40, pitch controller 40 may close fifth switch 128 to direct the energy to winding 106. Pitch controller 40 may operate fifth switch 128 at a duty cycle between approximately 0% and 100% to direct a portion of the excess energy to winding 106. Alternatively, pitch controller 40 may operate fifth switch 128 at approximately a 100% duty cycle to direct a maximum amount of excess energy to winding 106, or pitch controller 40 may operate fifth switch 128 at approximately a 0% duty cycle to substantially prevent excess energy from being directed to winding 106.

If a loss of power from grid source 110 or a failure within pitch control system 100 occurs, pitch control system 100 may switch to backup power provided by battery source 108 by opening grid contactors 114 and closing battery contactors 112. While pitch control system 100 is powered by battery source 108, pitch controller 40 does not control motor 102 via switching components 116. Rather, battery source 108 provides a substantially constant current to motor 102 and facilitates pitching blades 18 to a feathered position. In such operation, armature 104 and winding 106 are coupled in series with each other, such that battery source 108 provides an equal and commonly controlled current to armature 104 and winding 106, such that motor 102 operates substantially as a series DC motor. If power is restored from grid source 110 or the failure within pitch control system 100 is corrected, pitch control system 100 may resume operation via grid source 110 power by opening battery contactors 112 and closing grid contactors 114. While motor 102 is described herein as a DC motor, it should be recognized that motor 102 and/or pitch control system 100 may alternatively include one or more AC motors.

The above-described embodiments facilitate providing an efficient and cost-effective pitch control system for a wind turbine. The pitch control system facilitates independently controlling currents through the armature and the winding of the motor. As such, the pitch control system facilitates operating the motor as a separately excited DC motor while the pitch control system receives power from the grid. Moreover, the winding may absorb at least a portion of excess energy within the pitch control system, such as energy produced when the motor decelerates. When the pitch control system receives power from a backup power supply, such as a battery, the pitch control system facilitates controlling the armature and the winding via a common current. As such, the pitch control system facilitates operating the motor as a series DC motor while the pitch control system receives backup power. Moreover, the pitch control system described herein may facilitate operating a pitch drive of a wind turbine without a dynamic braking resistor and/or field rectification diodes.

Exemplary embodiments of a pitch control system and a method and apparatus for powering a pitch control system are described above in detail. The method, apparatus, and system are not limited to the specific embodiments described herein, but rather, components of the apparatus and/or system and/or steps of the method may be utilized independently and separately from other components and/or steps described herein. For example, the embodiments may also be used in combination with other systems and methods, and are not limited to practice with only the pitch control system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pitch control system for a wind turbine, said pitch control system comprising:
   a motor comprising an armature and a winding, said winding configured to absorb an excess energy from said pitch control system if a voltage of said motor exceeds a threshold voltage; and,
   a plurality of switching components configured to control a first current through said armature independently of a second current through said winding.

2. A pitch control system in accordance with claim 1, wherein said pitch control system is configured to switchably receive power from a first power source and a second power source.

3. A pitch control system in accordance with claim 2, wherein said first current is controlled independently of said second current when said pitch control system receives power from said first power source.

4. A pitch control system in accordance with claim 2, wherein said first current is substantially equal to said second current when said pitch control system receives power from said second power source.

5. A pitch control system in accordance with claim 1, wherein said plurality of switching components comprises a first pair of switching devices that are coupled to a first terminal of said armature.

6. A pitch control system in accordance with claim 5, wherein said plurality of switching components comprises a second pair of switching devices that are coupled to a second terminal of said armature.

7. A pitch control system in accordance with claim 6, wherein said plurality of switching components comprises a third pair of switching devices that are coupled to said winding.

8. A wind turbine, comprising:
   at least one blade; and,
   at least one pitch control system coupled to said at least one blade, said pitch control system comprising:
      a motor comprising an armature and a winding, said winding configured to absorb an excess energy from said pitch control system if a voltage of said motor exceeds a threshold voltage; and,
      a plurality of switching components configured to control a first current through said armature independently of a second current through said winding.

9. A wind turbine in accordance with claim 8, wherein said pitch control system is configured to switchably receive power from a first power source and a second power source.

10. A wind turbine in accordance with claim 9, wherein said first current is controlled independently of said second current when said pitch control system receives power from said first power source.

11. A wind turbine in accordance with claim 9, wherein said first current is substantially equal to said second current when said pitch control system receives power from said second power source.

12. A wind turbine in accordance with claim 8, wherein said plurality of switching components comprises a first pair of switching devices that are coupled to a first terminal of said armature.

13. A wind turbine in accordance with claim 12, wherein said plurality of switching components comprises a second pair of switching devices that are coupled to a second terminal of said armature.

14. A wind turbine in accordance with claim 13, wherein said plurality of switching components comprises a third pair of switching devices that are coupled to said winding.

15. A method for powering a pitch control system, said method comprising:
 coupling a motor to the pitch control system, the motor including an armature and a winding;
 configuring the pitch control system such that the winding absorbs an excess energy from the pitch control system if a voltage of the motor exceeds a threshold voltage;
 coupling a first power source and a second power source to the pitch control system; and,
 coupling a plurality of switching components to the motor, the plurality of switching components configured to control a first current through the armature independently of a second current through the winding.

16. A method in accordance with claim 15, further comprising controlling the first current independently of the second current when the pitch control system receives power from the first power source.

17. A method in accordance with claim 15, further comprising setting the first current equal to the second current when the pitch control system receives power from the second power source.

* * * * *